United States Patent [19]

Hofer

[11] Patent Number: 4,921,107

[45] Date of Patent: May 1, 1990

[54] MAIL SORTATION SYSTEM

[75] Inventor: John A. Hofer, Ridgefield, Conn.

[73] Assignee: Pitney Bowes Inc., Stamford, Conn.

[21] Appl. No.: 214,696

[22] Filed: Jul. 1, 1988

[51] Int. Cl.$^5$ ............................................... B07C 5/00
[52] U.S. Cl. .................................. 209/546; 209/564;
209/900; 364/478
[58] Field of Search ................................ 209/3.1–3.3,
209/546, 563, 564, 900; 364/478; 382/1

[56] References Cited

U.S. PATENT DOCUMENTS

| | | |
|---|---|---|
| 3,587,856 | 6/1971 | Lemelson . |
| 3,917,069 | 11/1975 | Alexander . |
| 3,928,724 | 12/1975 | Byram et al. . |
| 4,307,293 | 12/1981 | Lazzarotti et al. . |
| 4,358,017 | 11/1982 | Erikson ............................. 209/584 |
| 4,503,977 | 3/1985 | Kohno et al. . |
| 4,556,944 | 12/1985 | Daniels et al. . |
| 4,578,759 | 3/1986 | Horii ................................. 364/478 |
| 4,606,660 | 8/1986 | Bradshaw et al. ............... 209/3.1 X |
| 4,632,252 | 12/1986 | Haruki et al. ...................... 209/546 |
| 4,641,753 | 2/1987 | Tamada .............................. 209/546 |
| 4,796,196 | 1/1989 | Durst, Jr. et al. ................ 209/3.3 X |

Primary Examiner—Margaret A. Focarino
Assistant Examiner—Edward M. Wacyra
Attorney, Agent, or Firm—Robert H. Whisker; Melvin J. Scolnick; David E. Pitchenik

[57] ABSTRACT

A semi-automatic mail sortation system. The system includes an input for input of information to a processor, and a display and sorting system controlled by the processor. The sortation system also includes a data base of names and associated mail drops accessed through the processor. In operation a mail piece is presented to an operator who inputs the first few letters of the addressee's name and the processor accesses the data base to display a set of records consistent with the input. The operator then selects a record and the processor controls the sorting system to sort the mail piece in accordance with the mail drop in the selected record. If the addressee's name is not displayed at first the operator may use conventional display controls to search further in the data base.

14 Claims, 4 Drawing Sheets

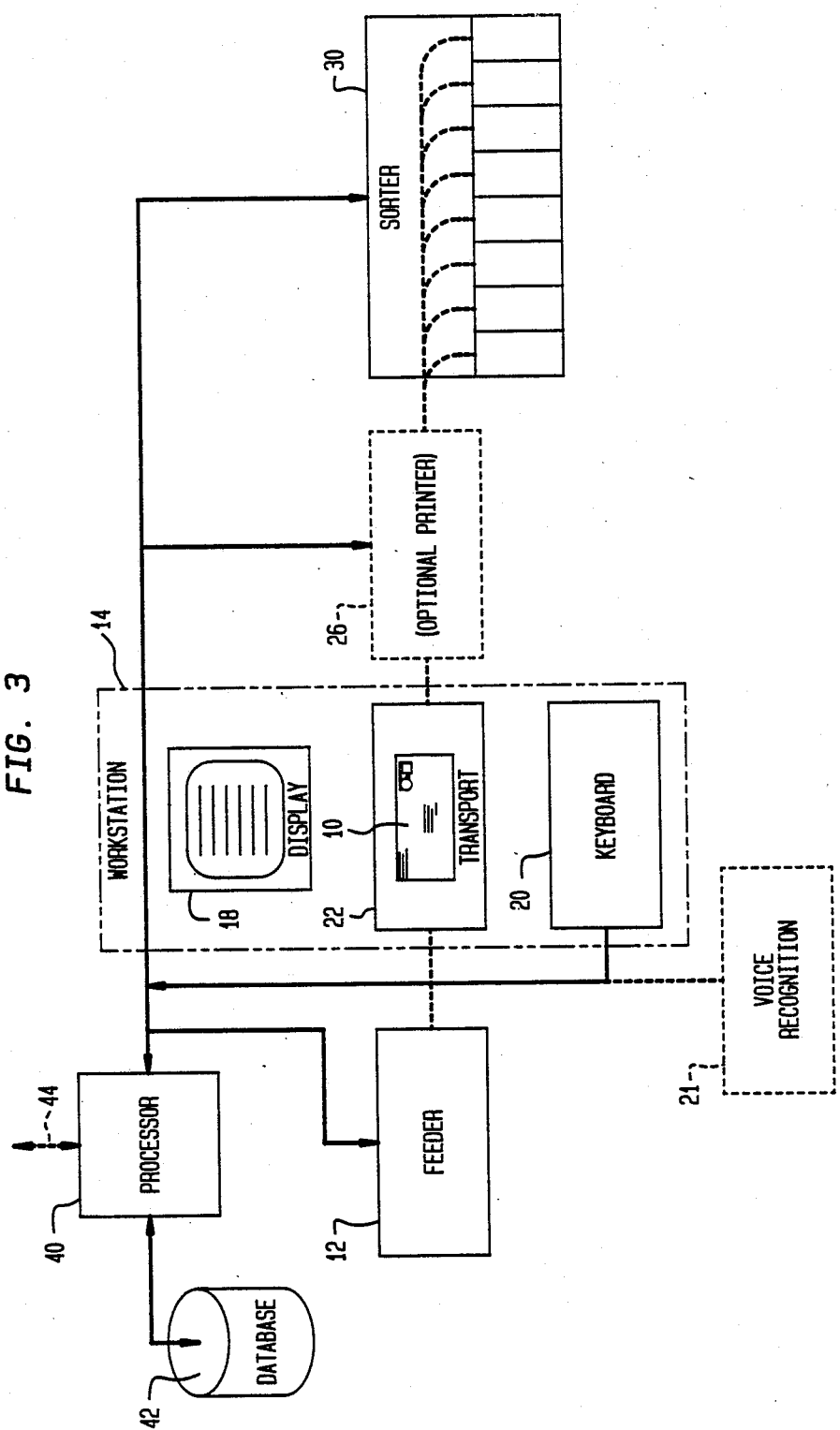

MAIL SORTATION SYSTEM

BACKGROUND OF THE INVENTION

This invention relates to systems for sorting mail pieces. More particularly, it relates to semi-automatic systems which operate partially under the control of a processor.

To date there have been two basic approaches to the problem of sorting mail pieces. For installations where there is a very large flow of mail to be sorted; on the order of thousands of pieces a day or more, large, highly automated systems which automatically scan mail pieces to determine their address and thereafter control an automatic sorting system to properly sort the mail pieces. These systems may use either highly sophisticated Optical Character Recognition (OCR) technology to recognize the addresses placed on the envelopes, or may use relatively simple bar code scanners to scan bar code which has been prerecorded on each mail piece. Typical of such systems are the OCR sortation system provided by the assignee of the subject invention to the U.S.P.S. In these systems highly sophisticated OCR systems were used to scan printed or handwritten addresses from each mail piece and automatic sortation equipment was controlled in accordance with the scanned address to properly sort the mail pieces. The OCR/CS system also included a bar-code printer for printing zip codes on envelopes in bar-code form on each mail piece so that each mail piece might be further sorted at local stations more efficiently.

Such systems have been extremely effective in sorting large volume mail flows, but are correspondingly expensive. Thus, while a typical OCR/CS system is capable of sorting thousands of pieces of mail per hour, it is correspondingly complicated and expensive and can only be justified at installations such as central post offices where the mail flow is great enough to fully utilize the capabilities of such a system and to justify its cost.

As noted, for smaller installations, fully automated systems relying on preprinted bar-code, or similar code, on each mail piece are known. However, in installations such as corporate mailrooms, where mail must be sorted to internal mail locations (hereinafter sometimes referred to as "mail drops") the sortation process has remained substantially manual, relying either on sorting tables, essentially unchanged for decades, or in some instances on manually controlled automatic sortation equipment controlled by an operator who reads each address and controls the sortation equipment accordingly. In either event, whether using a sorting table or a manually operated sortation machine, the mailroom employee directs the mail to the proper mail drop. Typically, the employee either makes use of a reference book to look up mail drops not included on the mail pieces to be sorted, or relies upon his/her memory to determine location codes. Relying on memory tends to be relatively fast, but also relatively inaccurate, while looking up the mail drop for individuals in a reference manual is relatively accurate, but very time consuming.

One approach to the sortation problem is described in U.S. Pat. No. 4,578,759, for: SHEET DISTRIBUTING APPARATUS, to: Horii, issued: Mar. 25, 1986, in which coded address information is applied to mail pieces. In the system of the cited reference, mail pieces are presented to an operator at a work station, and the operator inputs the name of the addressee. If the addressee's name is not sufficient to uniquely identify the addressee, the system request more information, first the street number and then the full street name. Once the system is able to uniquely match the addressee with a record stored in its data base, the system then controls the printer to print encoded information on the mail piece. A transport system then transports the mail piece to a conventional automatic sortation system including a scanner which scans the encoded information and controls the system in accordance with the information scanned from the envelope.

Those skilled in the art will readily recognize that the system of Horii is essentially functionally equivalent to the above described OCR/CS system with the substitution of a human operator for the OCR system of the OCR/CS. Thus, the system of Horii requires both a printer and a scanner in order to sort mail; making such systems overly complicated and expensive for relatively low level applications such as corporate mailrooms.

Thus, it is an object of the subject invention to provide a relatively simple and inexpensive mail sorting systems, suitable for applications such as corporate mailrooms.

It is another object of the subject invention to provide such a system which will provide improvements in both the speed and accuracy of mail sortation with respect to manual sortation.

It is another object of the subject invention to provide such a system which does not require precoding of mail pieces.

BRIEF SUMMARY OF THE INVENTION

The above objects are achieved and the disadvantages of the prior art are overcome by means of the method and apparatus of the subject invention where the apparatus is a mail sorting system which includes an input for input of information to a processor, a display controlled by the processor, a sorting system also controlled by the processor, and where the processor includes a data base of records of mailing information. In operation, information pertaining to one mail piece is input to the processor which then controls the display to display a set of records including at least one record consistent with the input information. The processor then responds to further information input by an operator in response to the displayed record to select one of the records and then outputs control signals to the sorting system to sort the mail piece in accordance with the sortation information contained in the selected record.

In a preferred embodiment of the subject invention, the data base records comprise the names of addressees and associated mail location codes and the input information includes selected initial letters of the addressee names.

In still another preferred embodiment of the subject invention, the data base is compiled in a separate, remote data processing center and downloaded to the processor of the subject invention, either over a communications link or by physical transfer of media. Most preferably, the data base file may be generated during the preparation of an internal telephone directory.

Thus, it may be seen that the above objects are achieved and the disadvantages of the prior art are overcome by a system which advantageously provides a simple, relatively low cost system highly suitable for relatively low volume sorting applications such as are typically found in corporate mailrooms. Other objects and advantages of the subject invention will be apparent to those skilled in the art from consideration of the attached drawings and of the detailed descriptions set forth below.

BRIEF DESCRIPTION OF THE DRAWINGS

FIG. 3 is a schematic block diagram of the system of FIG. 1.

DETAILED DESCRIPTION OF PREFERRED EMBODIMENTS

Figure 1:
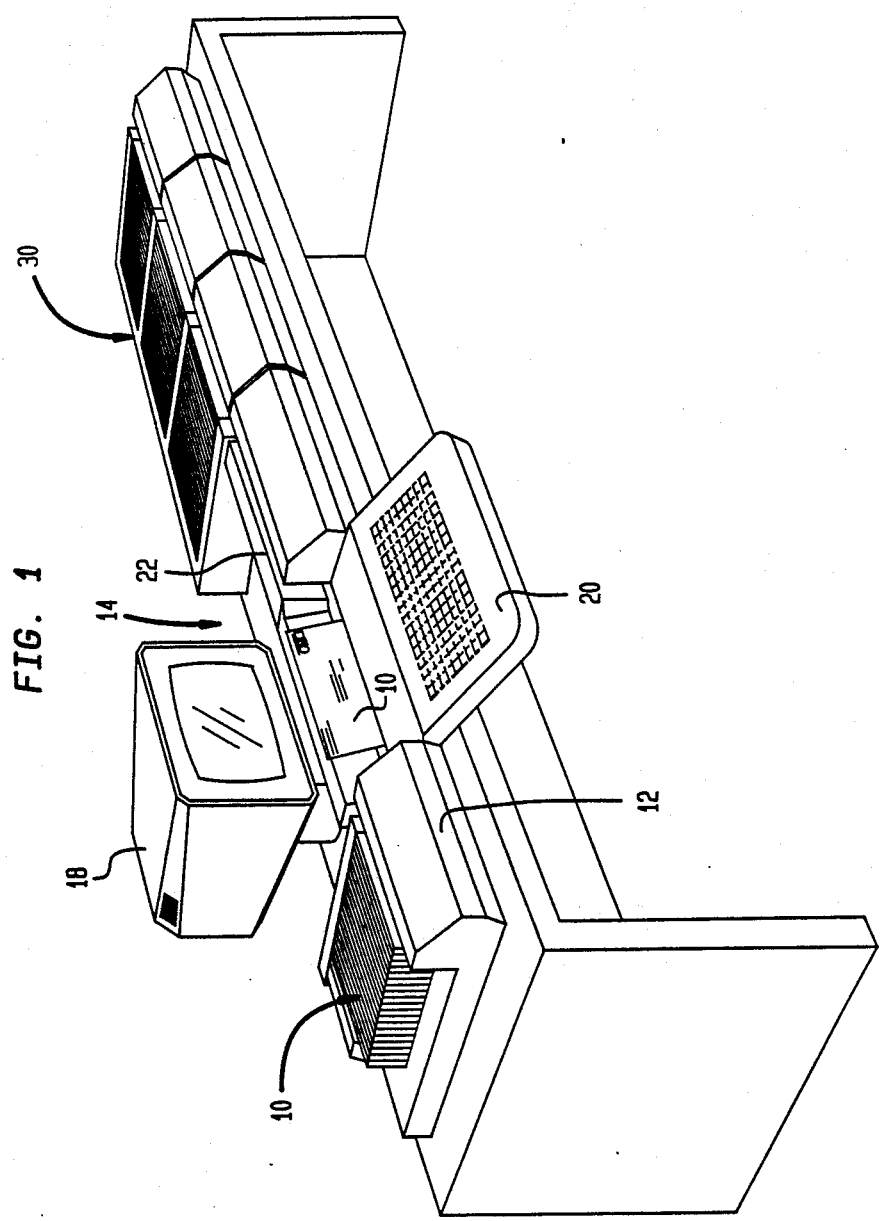
FIG. 1 shows a perspective view of a system in accordance with the subject invention.

In FIG. 1 mail pieces 10 are singulated and fed by a conventional feeder 12 to work station 14. Work station 14 includes a display 18 controlled by processor 40 (shown in FIG. 3), a keyboard input for the processor and transport 22. Transport 22 positions a singulated mail piece 10 for convenient scanning by the system operator. As will be described further below, the operator then inputs information relating to the mail piece 10, the processor displays a set of records consistent with that information, the operator selects a record, and the processor controls sorting system 30 to sort the singulated mail piece 10 in accordance with the sortation information in the selected record.

Figure 2A:
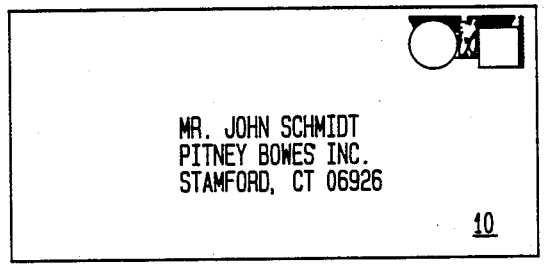
FIG. 2, which consists of FIGS. 2A-2D, illustrates the operation of the system of FIG. 1.
Figure 2B:
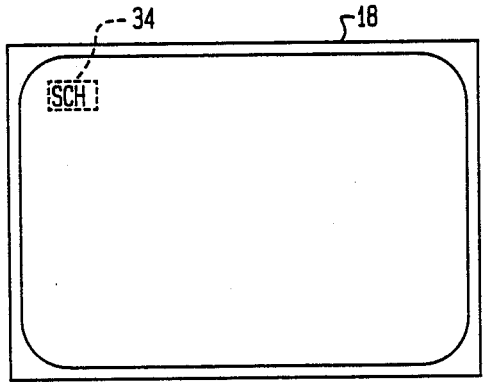
Figure 2C:
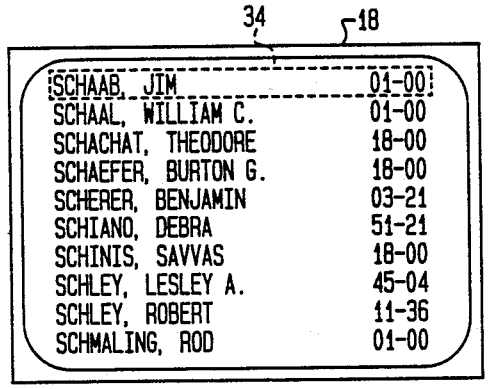
Figure 2D:
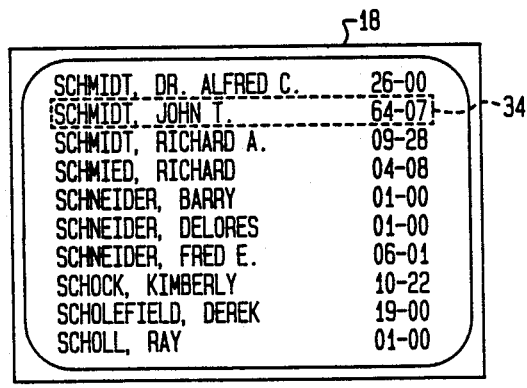

Turning to FIG. 2, the operation of the system of the subject invention is more completely illustrated. Mail piece 10, shown in FIG. 2A, addressed to:

---
Mr. John Schmidt
Pitney Bowes Inc.
Stamford, CT 06926
--- is assumed to be delivered to the corporate mailroom. Since the address does not include a mail drop, it is sorted in accordance with the subject invention as is shown in FIGS. 2B-2D. In FIG. 2B, the operator enters the first three letters of the last name of the addressee which appear on display 18 highlighted by cursor 34. In response to a command by the operator, in FIG. 2C the system then displays a first set of records consistent with the input information. The first name consistent with the input, in alphabetical order, is highlighted by cursor 34 on display 18. Examination of the set of records displayed in FIG. 2C quickly shows that the addressee's name is not included. Using conventional display controls, the operator then pages to the next set of records, uses conventional display controls to move cursor 34 to the addressee's name and selects that record, thus controlling the system to sort mail piece 10 to the mail drop location, 64-07, identified in that record. Alternative selection methods, such simple input of a number, which may be the mail drop per se, associated with the selected name are, of course, also within the contemplation of the subject invention.

Access to the data base of records as illustrated in FIG. 2 may be controlled by any of several commercially available data base management systems, well known to those skilled in the art, and further discussion of data base management is not believed necessary for an understanding of the subject invention. Of course, the operator need not be limited to input of three, or any other fixed number, of letters and it is anticipated that, as operators gain more experience, they will learn which names require more, and which fewer letters to locate.

FIG. 3 shows a schematic block diagram of the system of the subject invention. Conventional feeder 12 feeds mail pieces 10 on transport 22 to work station 14 in response to commands from processor 40. As described above, the system operator then uses keyboard 20 to input search characters (i.e. the first few letters of the addressee's name) to processor 40. Processor 40 then uses a conventional data base management system to access data base 42 and retrieve the first set of records consistent with the input search characters and display these records on display 18, as described above with respect to FIG. 2. The operator then inputs commands through keyboard 20 to locate and select the appropriate record. When the record is selected, processor 40 then controls transport 22 and sortor 30 to sort mail piece 10 in accordance with the sortation information included in the selected record. Sortation equipment 30 may be substantially similar to conventional sortation equipment currently used in Post Offices for manual sortation of mail, and as described in U.S. Pat. No. 4,307,292 to: Lazzarotti et al. Such equipment is conventional and need not be discussed further for an understanding of the subject invention.

In one alternative embodiment of the subject invention, conventional voice recognition equipment 21 may be used in place of, or to supplement, keyboard 20 as an input means. Suitable voice recognition equipment is manufactured by the Kurzweil Artificial Intelligence Corporation of Massachusetts, and provides a digital output equivalent to keyboard 20 in response to a verbal input. Use of such commercially available voice recognition equipment would be essentially transparent to processor 40 and to the operation of the system, and need not be discussed further here for an understanding of the subject invention.

In another alternative embodiment of the subject invention, an optional, conventional printer 26 may be included in the system to print location codes (i.e. the sortation information in the selected record) on mail piece 10 to facilitate further manual sortation if necessary.

In a preferred embodiment of the subject invention, a data link 44 is provided between processor 40 and a data processing center (not shown). A problem with the system of the subject invention is the need to establish and maintain data base 42. While it is within the contemplation of the subject invention to do this by manual input of the necessary invention, this would be a burdensome task for the mailroom. Fortunately, in most large corporations an internal directory of telephone numbers and mail drops is periodically published by the data processing center. In the preferred embodiments of the subject invention, a data link 44 is provided between processor 40 and the data processing center so that the file used to generate the directory can be transmitted to processor 40. Processor 40 then, using conventional data processing techniques well known to those skilled in the art can then convert this file, if necessary, to be compatible with the data base manager used and use the information to establish and/or maintain data base 42. Other files which relate names and mail drops may be used instead of telephone directory files.

Figure 4:
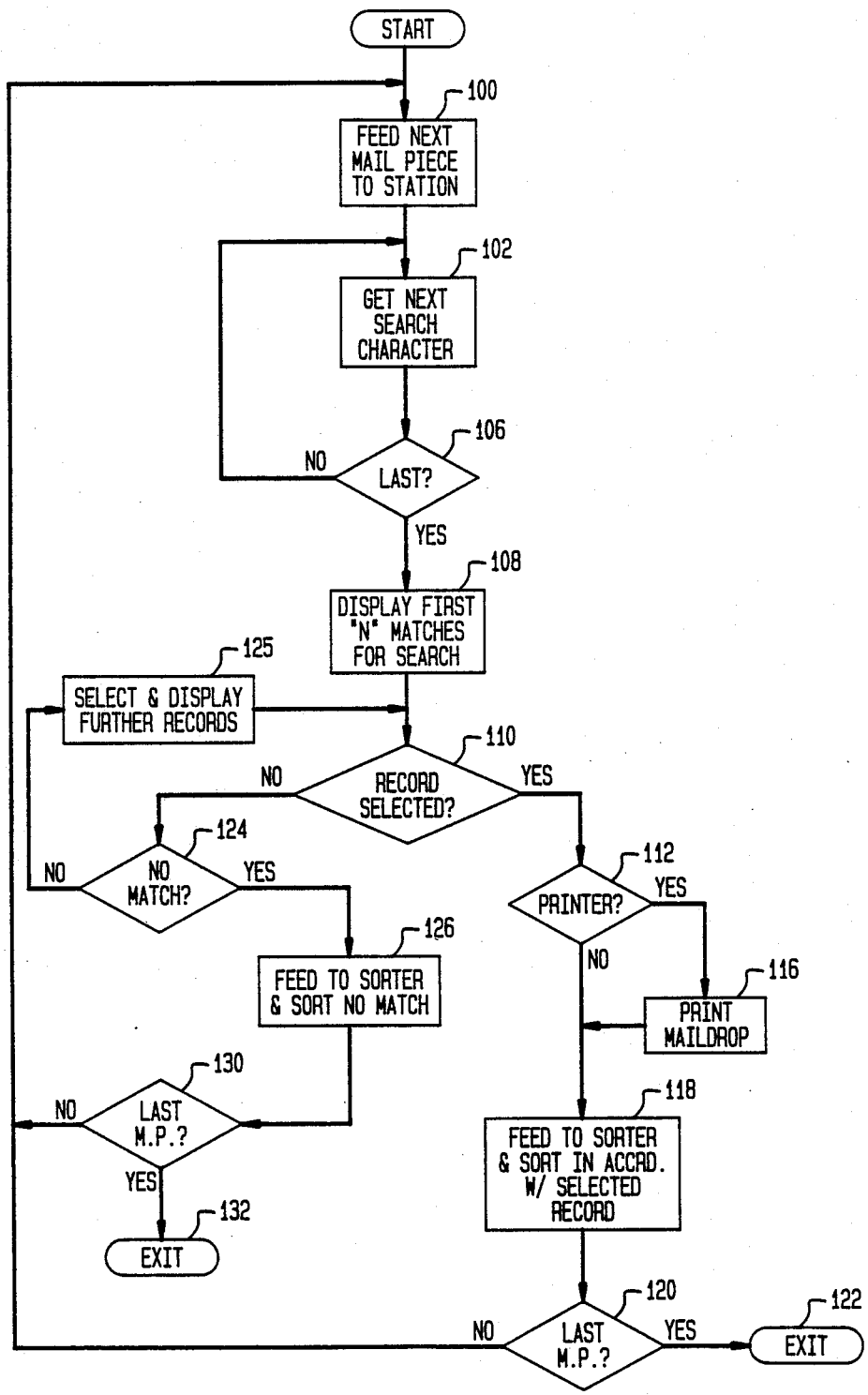
FIG. 4 is a flow chart of the operation of the system of FIGS. 1 and 3.

FIG. 4 shows a flow chart of the operation of processor 40. In response to a start command, at 100, processor 40 controls feeder 12 to feed the next (i.e. the first) mail piece 10 to station 14. At 102 processor 40 obtains the next search character input by the operator, and at 106 tests the operator input to determine if that was the last search character. If not, processor 40 returns to 102 for the next search character. When the operator indicates that the last search character has been input, processor 40, at 108, accesses data base 42 and controls display 18 to display the first "N" matches found in data base 42. At 110 processor 40 tests the operator input to determine if one of the displayed records has been selected. If a record has been selected, then, at 112, processor 40 first determines if a printer is available. If so, at 116 processor 40 controls printer 26 to print the mail drop information on mail piece 10. In either event then at 118 processor 40 controls the system to feed mail piece 10 to sorter 30 and to sort the information in accordance with the selected record. Then at 120 processor 40 determines if this is the last mail piece. If it is, at 122 processor 40 exits the routine, if it is not, processor 40 returns to 100 to feed the next mail piece to station 14.

If at 110 no record is selected, then at 112 processor 40 tests the operator input to determine if the operator has indicated that no match is found. The operator may conclude that no match can be found either because the addressee name is not included in the data base 42 or because insufficient information is provided in the address of mail piece 10 (e.g. a letter addressed to "Mr. Smith"). If the operator does not indicate that no match can be found then at 125 processor 40 selects and displays further records in response to display control signals input by the operator, and the system returns to 110. If the operator does indicate that no match is possible, processor 40 controls the system to feed mail piece 10 to sorter 30 and to sort mail piece 10 as an exception because no match could be found. Then at 130 processor 40 again tests to determine if this is the last mail piece, and if it is, exits at 132, or otherwise returns to 100 to feed the next mail piece.

Those skilled in the art will recognize that the description of FIG. 4 has been provided in terms of a single mail piece moving through the system of the subject invention for reasons of clarity. They will further recognize that it is well within the skill of those skilled in the art, and would be preferable, to program the system to operate synchronously so that as a record is selected and a mail piece moved off for printing and/or sortation, the next mail piece is moved into work station 14 concurrently.

Numerous additional embodiments of the subject invention will be apparent to those skilled in the art from consideration of the above detailed description and of the attached drawings. Particularly, it will be recognized that systems in accordance with the subject invention may include more than one operator terminal. Accordingly, it is to be understood that the above description and drawings have been provided by way of illustration only, and that limitations on the subject invention are to be found only in the claims set forth below.

What is claimed is:

1. A mail sorting system comprising:
    (a) input means for input of information to a processor means;
    (b) a display responsive to said processor means
    (c) sortation means, responsive to said processor means, for sorting mail pieces; wherein,
    (d) said processor means is responsive to said input means for:
        (d1) controlling said display in response to first information pertaining to one of said mail pieces to display a set of those records in a predetermined data base, said set including at least one record which is consistent with said first information, said records containing sortation information;
        (d2) responding to further information input by an operator in response to said displayed records to select one of said displayed records; and
        (d3) outputting control signals to said sortation means to sort said one mail piece in accordance with said sortation information contained in said selected record.

2. A system as described in claim 1 wherein said records include the names of addressees and said first information includes selected first letters of the name of the addressee of said one mail piece.

3. A system as described in claim 2 wherein said system further comprises printing means for printing said sortation information in said selected records on said one mail piece.

4. A system as described in claim 2 wherein said input means comprises voice recognition equipment.

5. A system as described in claim 2 wherein said processor means further comprises communications means for receiving a remotely generated file, said processor means than using said file to maintain said data base.

6. A system as described in claim 5 wherein said file contains a telephone directory, said directory including mail drops.

7. A system as described in claim 1 wherein said system further comprises printing means for printing said sortation information in said selected records on said one mail piece.

8. A system as described in claim 1 wherein said input means comprises voice recognition equipment.

9. A system as described in claim 1 wherein said processor means further comprises communications means for receiving a remotely generated file, said processor means than using said file to maintain said data base.

10. A system as described in claim 9 wherein said file comprises a telephone directory, said directory including mail drops.

11. A method of sorting mail pieces comprising the steps of:
    (a) providing a data base of records of mail sortation information:
    (b) displaying a set of said records, said set including at least one record which is consistent with first information pertaining to one of said mail pieces;
    (c) selecting one of said displayed records, and,
    (d) controlling sortation equipment to sort said one mail piece in accordance with said mail sortation information comprised in said selected record.

12. A method as described in claim 11 wherein said records include the names of addressees and said first information includes selected first letters of the name of the addressee of said one mail piece.

13. A method as described in claim 12 wherein said step of providing a data base further comprises the steps of generating a file comprising a directory, said directory including mail drops, and of extracting from said file records which include names and associated mail drops.

14. A method as described in claim 11 wherein said step of providing a data base further comprises the steps of generating a file comprising a directory, said directory including mail drops, and of extracting from said file records which include names and associated mail drops.

* * * * *